United States Patent [19]
Yoshida et al.

[11] Patent Number: 5,033,812
[45] Date of Patent: Jul. 23, 1991

[54] GRATING COUPLER

[75] Inventors: Toshihiko Yoshida; Osamu Yamamoto, both of Nara, Japan

[73] Assignee: Sharp Kabushiki Kaisha, Osaka, Japan

[21] Appl. No.: 481,369

[22] Filed: Feb. 16, 1990

[30] Foreign Application Priority Data

Feb. 17, 1989 [JP] Japan .................................. 1-38686

[51] Int. Cl.$^5$ .............................................. G02B 6/34
[52] U.S. Cl. .................................................. 350/96.19
[58] Field of Search ............... 350/96.12, 96.13, 96.15, 350/96.19

[56] References Cited

U.S. PATENT DOCUMENTS

| | | | |
|---|---|---|---|
| 4,696,536 | 9/1987 | Albares et al. | 350/96.19 |
| 4,815,843 | 3/1989 | Tiefenthaler et al. | 350/96.19 X |
| 4,852,961 | 8/1989 | Yamamoto et al. | 350/96.19 |
| 4,935,930 | 6/1990 | Handa | 350/96.12 X |

OTHER PUBLICATIONS

T. Tamir et al., "Analysis and Design of Grating Couplers", Applied Physics vol. 14, pp. 235-254, (1977).

Primary Examiner—John D. Lee
Attorney, Agent, or Firm—Irell & Manella

[57] ABSTRACT

A grating coupler comprising an optical waveguide and a grating formed on the optical waveguide in which light is propagated for optically coupled light rays inside and outside of the optical waveguide, wherein the coupling coefficient of the grating coupler is gradually changed in the direction of propagation of guided light in the optical waveguide, whereby the intensity distribution of light rays inside or outside of the optical waveguide agrees with the coupling efficiency distribution of the grating coupler, so the coupling efficiency of the grating coupler can be greatly improved.

2 Claims, 5 Drawing Sheets

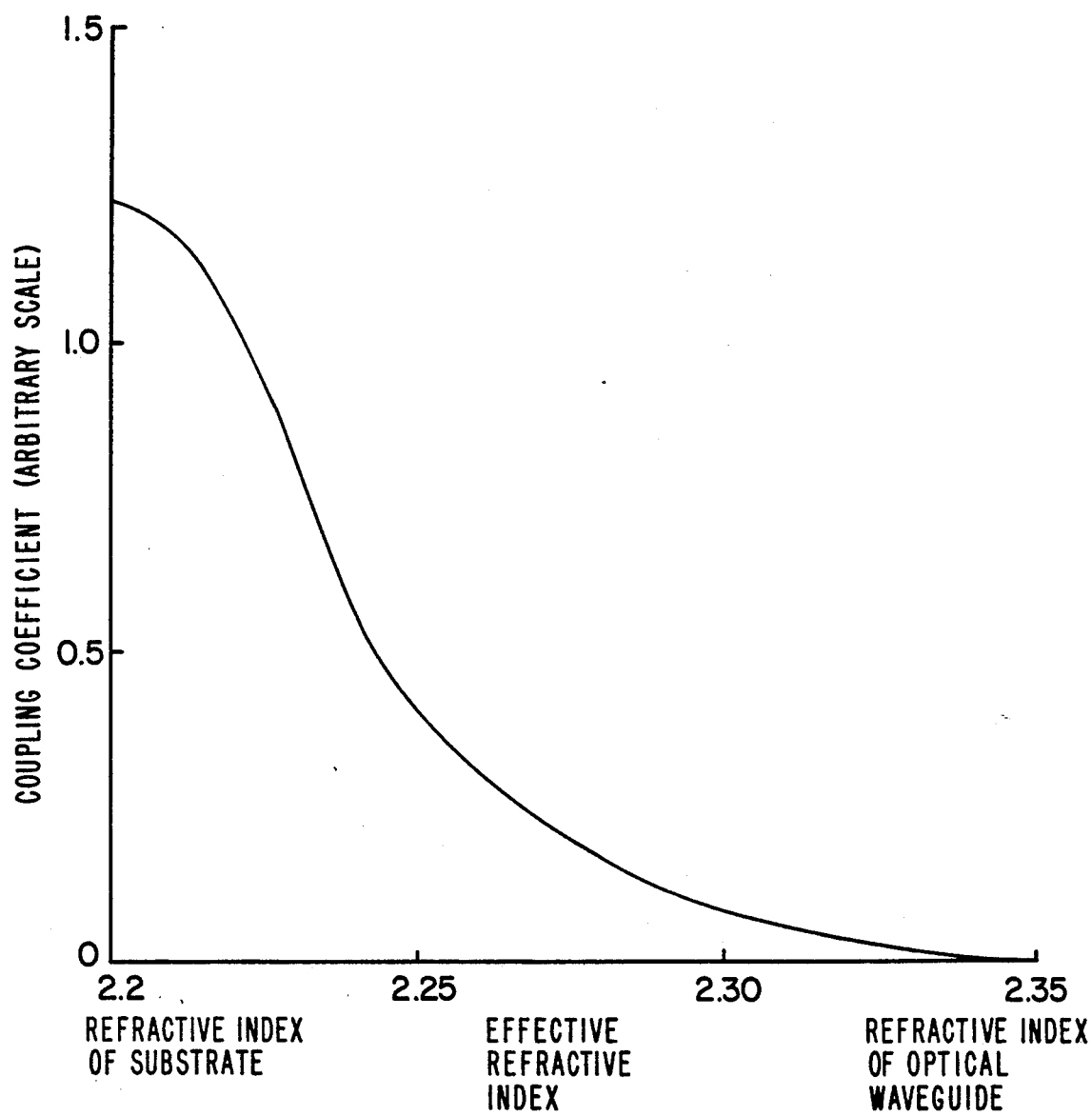

GRATING COUPLER

BACKGROUND OF THE INVENTION

1. Field of the invention:

The present invention relates to a grating coupler for inputting light into an optical waveguide or emitting light from an optical waveguide in integrated optical elements or other optical elements with the optical waveguide in which light is propagated.

2. Description of the prior art:

Integrated optical pickups, integrated optical scanner elements, integrated optical Doppler speedometers and other integrated optical elements have attained high performance by using an optical waveguide in which light is propagated. In order to input a light into the optical waveguide of the these types of integrated optical elements, the end of said optical waveguide is optically polished and the light is converged by a lens with a large numerical aperture (NA) and input from the optically polished end of the optical waveguide into the inside of the optical waveguide. However, when a light is input into an optical waveguide in this manner, the end of the optical waveguide must be optically polished with high precision and the optical axis of the lens and the optical waveguide must be adjusted precisely.

In contrast to this method, other methods are being widely used whereby light is input into an optical waveguide or emitted from the optical waveguide by means of a grating coupler which is easy to integrate because of its small size and thin structure.

A grating coupler is constituted by positioning a grating on the top of an optical waveguide. The grating has various configurations such as multiple straight lines with the same pitch, multiple curved lines whose pitch gradually changes, and the like.

FIG. 5a is a plan view showing a conventional grating coupler and FIG. 5b is a cross section of the same. The grating coupler is constituted by forming a grating on the top of an optical waveguide 42 that is formed on the top of a crystalline substrate 41 of $LiNbO_3$ or other material. The optical waveguide 42 is formed in the middle of the substrate from side to side and along its length with a uniform width and thickness. The grating 43 is composed of multiple plate-like transparent elements of equal length and intersecting the optical waveguide 42 perpendicularly to its length. When light is projected on the grating 43, the light enters into the optical waveguide 42 through the grating 43 and is propagated within said optical waveguide 42. The guided light propagated in the optical waveguide 42 is emitted from the grating 43 to the outside of the waveguide 42.

When the guided light 21 propagated in the optical waveguide 42 is emitted from the grating 43 in such a conventional grating coupler, the coupling efficiency is as follows.

The light propagated in the grating coupler gradually attenuates during propagation. Where z represents the coordinate of the direction of propagation in the grating coupler of the guided light 21 in the optical waveguide 42, the intensity of the light emitted from the grating coupler is obtained by the differential equation shown in equation 1.

$$\frac{dP_0}{dz} = -\eta P_0 \quad (1)$$

From equation 1

$$P_0 \sim \exp(-\eta z) \quad (2)$$

Accordingly, the intensity distribution of the emitted light is represented by an exponential function as is indicated in FIG. 5b.

In this way, the light propagated in the optical waveguide 42 is emitted from the grating coupler with an exponential intensity distribution. However, since the grating is an optically reciprocal element, if the light entering the grating has this kind of exponential intensity distribution, the intensity of light propagated in the optical waveguide 42 becomes constant, so the coupling efficiency of the grating optical coupler is markedly improved.

In reality, however, it is difficult to give the light entering the grating coupler or propagated in the optical waveguide the exponential intensity distribution explained above, and normally it has a symmetrical intensity distribution like that of a semiconductor laser beam. Therefore, the coupling efficiency of grating couplers is limited to about 80%.

SUMMARY OF THE INVENTION

The grating coupler of this invention, which overcomes the above-discussed and numerous other disadvantages and deficiencies of the prior art, comprises an optical waveguide and a grating formed on said optical waveguide in which light is propagated for optically coupled light rays inside and outside of said optical waveguide, wherein the coupling coefficient of said grating coupler is gradually changed in the direction of propagation of guided light in said optical waveguide.

In a preferred embodiment, the width of said optical waveguide is tapered in the direction of propagation of the guided light therein so that the narrowest portion of said optical waveguide is positioned at one end of said grating and the widest portion thereof is positioned at the other end of said grating.

In a preferred embodiment, the thickness of said optical waveguide is tapered in the direction of propagation of the guided light therein so that the thinnest portion of said optical waveguide is positioned at one end of said grating and the thickest portion thereof is positioned at the other end of said grating.

Thus, the invention described herein makes possible the objective of providing a grating coupler in which the intensity distribution of light rays inside or outside of the optical waveguide agrees with the coupling efficiency distribution of the grating coupler, whereby the coupling efficiency thereof can be greatly improved.

BRIEF DESCRIPTION OF THE DRAWINGS

This invention may be better understood and its numerous objects and advantages will become apparent to those skilled in the art by reference to the accompanying drawings as follows:

FIG. 1b is a cross sectional view showing the grating coupler of FIG. 1a.

FIG. 2 is a graph showing the relationship between the effective refractive index of the optical waveguide and the coupling coefficient of the grating coupler of FIG. 1a.

FIG. 4 is a schematic diagram showing a production process of the grating coupler of FIG. 3a.

DESCRIPTION OF THE PREFERRED EMBODIMENTS

Example 1

Figure 1A:
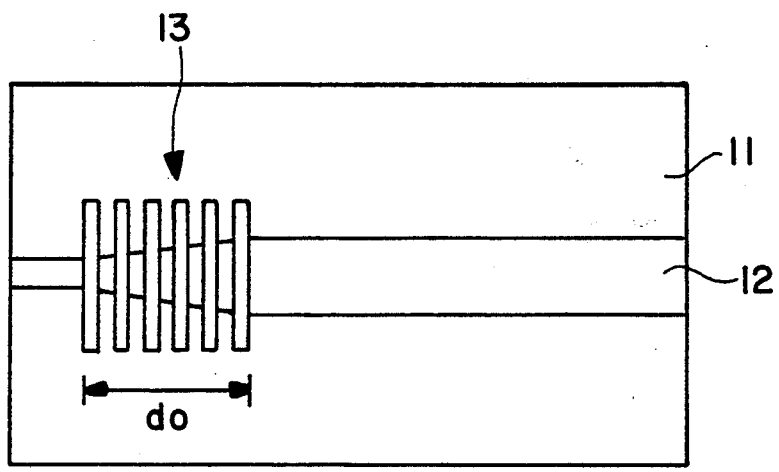
FIG. 1a is a plan view showing a grating coupler of this invention.
Figure 1B:
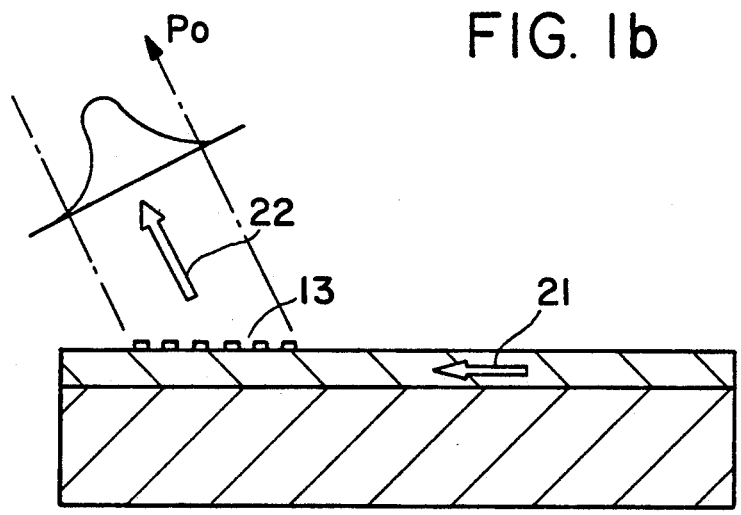

FIGS. 1a and 1b show a grating coupler of the present invention, which comprises a grating 13 with a length $d_0$ that is positioned in the longitudinal direction of a strip-like optical waveguide 12 on the said optical waveguide 12 formed on a substrate 11 made of, for example, $LiNbO_3$. The optical waveguide 12 is normally formed with a uniform thickness by an proton exchange method.

The grating 13 is positioned on the optical waveguide 12. The width of the optical waveguide 12 is uniform except for that the portion on which the grating 13 is positioned, where the width gradually tapers down.

The grating 13, which is positioned on the tapered part of the optical waveguide 12, is constructed from multiple plate-like scatterers of equal length, the plate-like scatterers intersecting the optical waveguide 12 perpendicularly to its length.

The optical waveguide 12 is formed by applying an electron beam resist such as polymethylmethacrylate on the substrate 11, drawing a mask pattern with the shape mentioned above by electron beam exposure, developing the resist, and the using a normal proton exchange method. The grating 13 is formed by depositing a transparent film such as $Si_3N_4$ on the substrate 11 on which the optical waveguide 12 has been formed, applying electron beam resist to the transparent film, drawing the grating pattern using an electron beam exposure method and etching the pattern using an etchant such as buffered HF. The length of the grating coupler is preferably of about 500 μm in order to avoid aberration by the electron beam exposure apparatus.

By changing the width of the optical waveguide 12, the coupling coefficient of the grating coupler is changed. FIG. 2 is a graph showing the relationship between the effective refractive index of the optical waveguide and the coupling coefficient of the grating coupler. The effective refractive index is approximately proportional to the width of the optical waveguide. The width of the portion of the optical waveguide 12 under the grating 13 of this example is set so that the coupling coefficient is highest at the end toward the narrower part of the optical waveguide under the grating 13 and the coupling coefficient changes linearly. As seen from the graph of FIG. 2, the effective refractive index becomes equal to the refractive index of the substrate at the narrowest portion of the optical waveguide 12, which is the cutoff point where guided light is no longer propagated. The coupling coefficient decreases monotonically as the effective refractive index becomes larger with the increase in the width of the optical waveguide 12. In this example, the width of the optical waveguide 12 is tapered so that the narrowest portion of the optical waveguide width where the coupling coefficient is highest is positioned at one end of the grating 13, and the widest portion thereof is positioned at the other in the direction of propagation of the guided light.

When light enters into the grating 13 of the grating coupler with the above-mentioned configuration, the light is diffracted by the said grating 13 and directed into the optical waveguide 12 where it is propagated. The light propagated in the optical waveguide 12 is diffracted by the grating 13 from which it is emitted.

The emission of the guided light 21 propagated in the optical waveguide 12 from the grating coupler to the outside of the grating coupler is described below: Where the intensity of the emitted light 22 is $P_0$, the coupling coefficient of the grating coupler is $\eta$ and the coordinate of the direction of propagation of the guided light is z, the intensity $P_0$ of the emitted light is given by the following differential equation 3.

$$dP_0/dz = -\eta z P_0 \quad (3)$$

The coupling coefficient of the grating coupler is a linear function of z, so $$P_0 \sim \exp(-Z^2/2) \quad (4)$$

and the intensity $P_0$ of the emitted light demonstrates a Gaussian distribution (see FIG. 1b).

In this way, when the coupling coefficient of the grating coupler changes at a uniform rate in the direction of propagation of the guided light, the intensity of the emitted light exhibits a Gaussian distribution with respect to the guided light of a uniform intensity, so that the distribution of the coupling efficiency of the grating coupler becomes a Gaussian distribution. Accordingly, the grating coupler attains the same coupling efficiency distribution as that of light with a Gaussian intensity distribution like that of a laser beam, and as long as the grating coupler is sufficiently long in the direction of propagation in the optical waveguide, attenuation of the light is reduced even though the overall coupling coefficient is low. As a result, the grating coupler attains an optical coupling with high efficiency between the light rays inside and outside of the optical waveguide.

Example 2

Figure 3A:
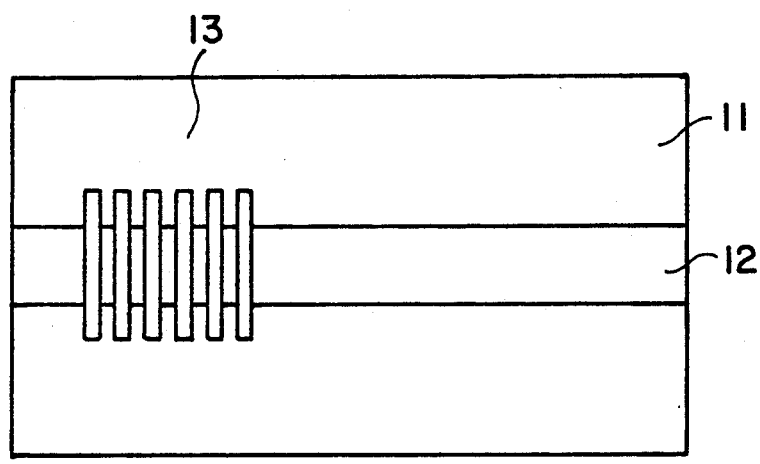
FIGS. 3a and 3b, respectively, are a plan view and a cross sectional view showing another grating coupler of this invention.
Figure 3B:
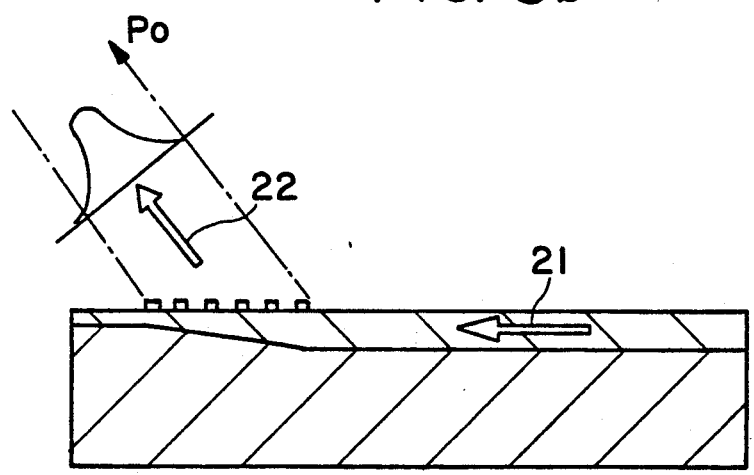

FIGS. 3a and 3b show another grating coupler of the present invention, in which the coupling coefficient of the grating coupler is changed by keeping the width of the optical waveguide 12 constant and varying the thickness of the optical waveguide 12 under the area where the grating 13 is formed. In this case, the change in the coupling coefficient of the grating coupler in relation to the change in the thickness of the optical waveguide 12 is observed in advance, and the thickness of the optical waveguide 12 is set so that the coupling coefficient is highest underneath one end of the grating 13 and lowest underneath the other end of the grating 13, the thickness therebetween changing linearly. In this way, the thickness of the optical waveguide 12 is tapered in the thickness direction so that the thinnest portion of the optical waveguide 12 is positioned at one end of the grating 13 and the thickest portion thereof is positioned at the other in the direction of propagation of the guided light. Other configurations are the same as the working example shown in FIG. 1.

Figure 4:
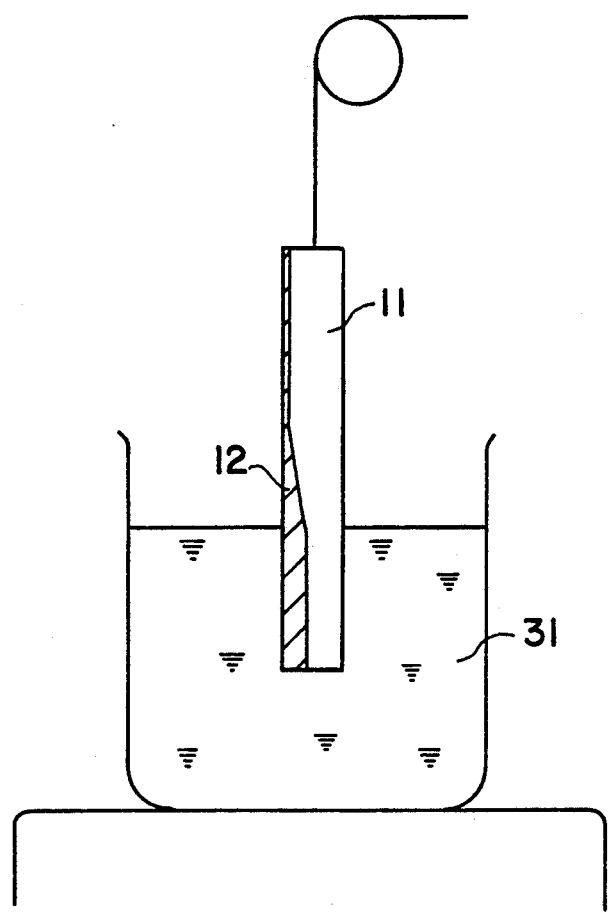
Figure 5A:
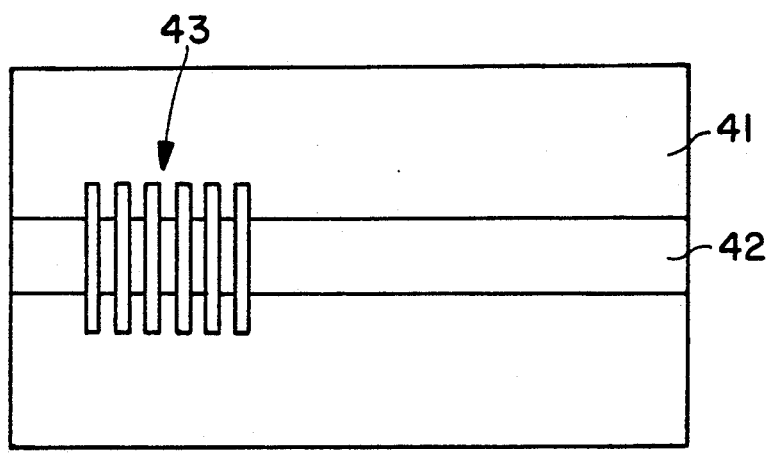
FIGS. 5a and 5b, respectively, are a plan view and a cross sectional view showing a conventional grating coupler.
Figure 5B:
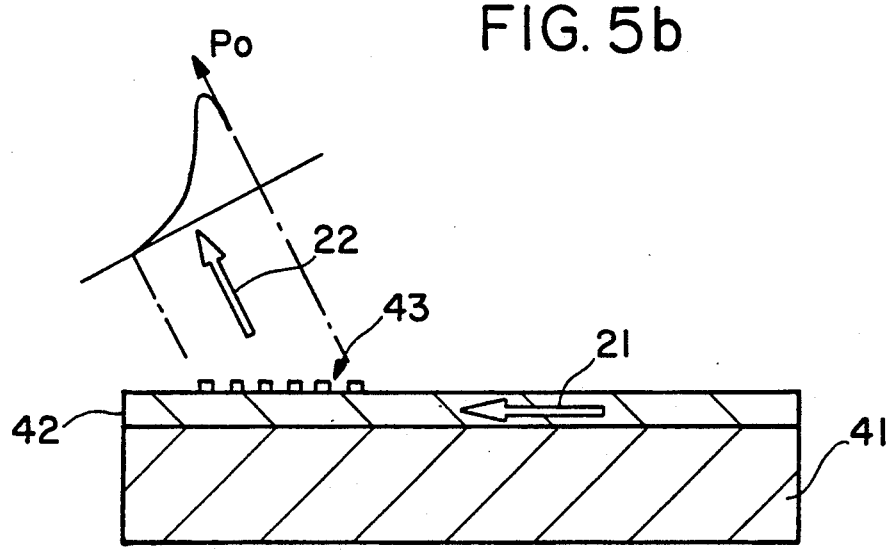

The thickness of the optical waveguide 12 can be changed by changing the proton exchange time because the thickness is proportional to the square root of the proton exchange time. To change the thickness of the optical waveguide 12, as shown in FIG. 4, by changing the proton exchange time, the substrate 11 can be suspended perpendicularly in the proton exchange solution 31 and then gradually lifted out therefrom.

Although the above-mentioned examples only disclose the method by which the optical waveguide was formed on an LiNbO$_3$ substrate by proton exchange and the grating was formed from an Si$_3$N$_4$ film laminated on the said optical waveguide, the present invention is applicable to a method by which the optical waveguide is formed by subjecting an ITO film, an electron beam resist or other transparent film to an appropriate etching technique.

Moreover, LiTaO$_3$ (tantalic acid lithium), KTiOPO$_4$ (KTP), etc., in which an optical waveguide can be easily formed by proton exchange at a low temperature of about 200° C. can be used as the substrate.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A grating coupler comprising an optical waveguide and a grating formed on said optical waveguide in which light is propagated for optically coupled light rays inside and outside of said optical waveguide, wherein the coupling coefficient of said grating coupler is gradually changed in the direction of propagation of guided light in said optical waveguide, wherein the width of said optical waveguide is tapered in the direction of propagation of the guided light therein so that the narrowest portion of said optical waveguide is positioned at one end of said grating and the widest portion thereof is positioned at the other end of said grating.

2. A grating coupler comprising an optical waveguide and a grating formed on said optical waveguide in which light is propagated for optically coupled light rays inside and outside of said optical waveguide, wherein the coupling coefficient of said grating coupler is gradually changed in the direction of propagation of guided light in said optical waveguide, wherein the thickness of said optical waveguide is tapered in the direction of propagation of the guided light therein so that the thinnest portion of said optical waveguide is positioned at one end of said grating and the thickest portion thereof is positioned at the other end of said grating.

* * * * *

REEXAMINATION CERTIFICATE (2107th)

United States Patent [19]
Yoshida et al.

[11] B1 5,033,812
[45] Certificate Issued Oct. 12, 1993

[54] GRATING COUPLER WITH A TAPERING WAVEGUIDE FOR CHANGING A COUPLING COEFFICIENT

[75] Inventors: Toshihiko Yoshida; Osamu Yamamoto, both of Nara, Japan

[73] Assignee: Sharp Kabushiki Kaisha, Osaka, Japan

Reexamination Request:
No. 90/002,876, Oct. 23, 1992

Reexamination Certificate for:
Patent No.: 5,033,812
Issued: Jul. 23, 1991
Appl. No.: 481,369
Filed: Feb. 16, 1990

[30] Foreign Application Priority Data
Feb. 17, 1989 [JP] Japan .................................. 1-38686

[51] Int. Cl.$^5$ .............................................. G02B 6/34
[52] U.S. Cl. .......................................... 385/37; 385/43
[58] Field of Search .................... 385/31, 37, 39, 43

[56] References Cited
FOREIGN PATENT DOCUMENTS
63-96606 4/1988 Japan .

*Primary Examiner*—John D. Lee

[57] ABSTRACT

A grating coupler comprising an optical waveguide and a grating formed on the optical waveguide in which light is propagated for optically coupled light rays inside and outside of the optical waveguide, wherein the coupling coefficient of the grating coupler is gradually changed in the direction of propagation of guided light in the optical waveguide, whereby the intensity distribution of light rays inside or outside of the optical waveguide agrees with the coupling efficiency distribution of the grating coupler, so the coupling efficiency of the grating coupler can be greatly improved.

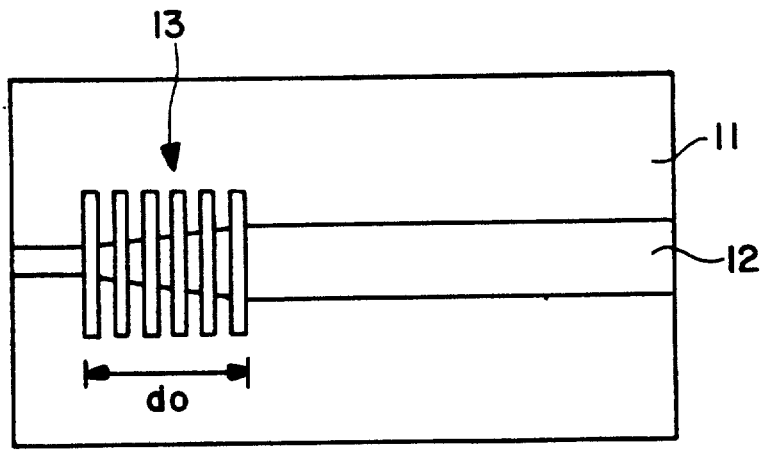

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

New claims 3 and 4 are added and determined to be patentable.

1. A grating coupler comprising an optical waveguide and a grating formed on said optical waveguide in which light is propagated for optically coupled light rays inside and outside of said optical waveguide, wherein the coupling coefficient of said grating coupler is gradually *and linearly* changed in the direction of propagation of guided light in said optical waveguide, wherein the width of said optical waveguide is tapered *so as to make the width smaller* in the direction of propagation of the guided light therein so that the narrowest portion of said optical waveguide is positioned at one end of said grating and the widest portion thereof is positioned at the other end of said grating.

2. A grating coupler comprising an optical waveguide and a grating formed on said optical waveguide in which light is propagated for optically coupled light rays inside and outside of said optical waveguide, wherein the coupling coefficient of said grating coupler is gradually *and linearly* changed in the direction of propagation of guided light in said optical waveguide, wherein the thickness of said optical waveguide is tapered *so as to make the thickness thinner* in the direction of propagation of the guided light therein so that the thinnest portion of said optical waveguide is positioned at one end of said grating and the thickest portion thereof is positioned at the other end of said grating, *wherein said grating is constructed from multiple plate-like scatterers of equal length, the plate-like scatterers intersecting the optical waveguide perpendicularly to its length.*

*3. A grating coupler, according to claim 1, wherein an intensity of emitted light from said grating exhibits a Gaussian distribution.*

*4. A grating coupler according to claim 1, wherein said grating is constructed from multiple plate-like scatterers of equal length, the plate-like scatterers intersecting the optical waveguide perpendicularly to its length.*

* * * * *